(12) United States Patent
Starikov

(10) Patent No.: US 7,369,697 B2
(45) Date of Patent: May 6, 2008

(54) PROCESS VARIABLE OF INTEREST MONITORING AND CONTROL

(75) Inventor: Alexander Starikov, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 713 days.

(21) Appl. No.: 10/871,294

(22) Filed: Jun. 17, 2004

(65) Prior Publication Data

US 2005/0281451 A1    Dec. 22, 2005

(51) Int. Cl.
    *G06K 9/00* (2006.01)

(52) U.S. Cl. .................... 382/141; 438/14; 438/700; 702/182; 716/4

(58) Field of Classification Search ............ 382/141, 382/144, 145, 151, 149, 148, 190; 166/272.3, 166/50; 340/2.29; 514/302; 585/276, 277; 528/48; 428/423.1, 475.2; 327/552; 546/116; 702/20, 182, 127, 172; 250/491.1, 492.2, 250/339.01; 438/14, 18, 11, 5, 696, 706, 438/700; 257/E21.235, E21.027; 716/4, 716/20, 15, 19, 21; 430/30; 156/345.13; 355/77, 52, 53; 356/485, 511, 517
See application file for complete search history.

(56) References Cited

U.S. PATENT DOCUMENTS

| | | | |
|---|---|---|---|
| 5,276,337 A | 1/1994 | Starikov | |
| 5,805,273 A * | 9/1998 | Unno | .......... 355/30 |
| 5,879,866 A | 3/1999 | Starikov et al. | |
| 6,004,706 A | 12/1999 | Ausschnitt et al. | |
| 6,027,842 A | 2/2000 | Ausschnitt et al. | |
| 6,063,531 A | 5/2000 | Singh et al. | |
| 6,309,809 B1 | 10/2001 | Starikov et al. | |
| 6,317,211 B1 * | 11/2001 | Ausschnitt et al. | ........ 356/401 |
| 6,337,217 B1 | 1/2002 | Hause et al. | |
| 6,581,023 B1 | 6/2003 | Kim | |
| 6,673,638 B1 | 1/2004 | Bendik et al. | |
| 6,974,653 B2 * | 12/2005 | Leung et al. | ............ 430/30 |
| 2002/0053353 A1 * | 5/2002 | Kawata et al. | ........... 134/1.3 |
| 2004/0130689 A1 | 7/2004 | Starikov et al. | |
| 2005/0094132 A1 | 5/2005 | Starikov et al. | |
| 2005/0181711 A1 | 8/2005 | Starikov et al. | |

OTHER PUBLICATIONS

Wang et al., "A novel approach for modeling and diagnostics of lithography process", AEC/APC XII symposium 2001, pp. 1-5.*
Shishido et al., "dose and focus estimation using top -down SEM images", 9 pages.*
Allgair et al., "application of image diagnostics to metrology quality assurance and process control", SPIE microlithography 2003, pp. 1-28.*

(Continued)

*Primary Examiner*—Sheela Chawan
(74) *Attorney, Agent, or Firm*—Schwabe, Williamson & Wyatt, P.C.

(57) ABSTRACT

Methods for monitoring and controlling process variables of interest during the substrate manufacturing process is provided. Numerical estimates for selected attributes of a feature of interest may be analyzed and applied in a numerical estimator to estimate the process variable of interest for a given product process run. The resulting estimations may be used to provide feedback control data for error correction on subsequent product substrate.

29 Claims, 4 Drawing Sheets

OTHER PUBLICATIONS

Allgair et al., "Applications of Image Diagnostics to Metrology Quality Assurance and Process Control," SPIE Microlithography 2003, pp. 1-28.

Dodgson, "Some Notes on Sampling Theory for the Part II Information Theory & Coding Course," based on Computer Lab. Tech. Report No. 261, Feb. 18, 2003, pp. 1-16.

Eichelberger et al., "Simultaneous Dose and Focus Monitoring On Product Wafers," 8 pgs.

Shishido et al., "Dose and Focus Estimation Using Top-Down SEM Images," 9 pgs.

Starikov, "Metrology of Image Placement," Ch. 17, Handbook of Silicon Semiconductor Metrology, A.C. Diabold, Ed., Marcel Dekker, 2001, pp. 1-25.

Wang et al., "A Novel Approach for Modeling and Diagnotics of Lithography Process," AEC/APC XII Symposium 2001, pp. 1-5.

* cited by examiner

FIG. 1

100 - select a process variable to monitor/or and control.

110 - apply an image to a surface of a substrate through a lithography process, the surface having at least one feature of interest, and command the process variable of interest through a determined process range.

120 - generate an image of the at least one feature of interest using a metrology device.

130 - collect numerical data of an image attribute over a threshold range.

140 – generate an empirical estimator to estimate the value of the process variable of interest using the numerical data, substantially independent of other process variables.

150 - validate the empirical estimator.

160 – control the process using the estimated values of the process variable of interest generated by the validated empirical estimator.

FIG. 3

300 - print multiple features of interest in a substrate that have certain process variables of interest inflicted at fixed and known values.

310 - estimate the values for the process variable of interest in accordance with embodiments of the present invention as described with respect to FIG. 1.

320 - Verify the results of the numerical estimator for the process variable of interest by comparing the estimated values to the known values of the process variable of interest.

FIG. 4

400 – observe the process variable of interest over a predetermined time period.

410 - establish a baseline average for the process variable of interest, accounting for a selected standard deviation.

420 – designate the average as the set point.

430 – establish upper and lower control limits for the process variable of interest.

440 – compare the latest value of the process variable of interest to the baseline average.

450 – monitor the process for a process excursion and use a corrective feed back loop to take corrective action if needed.

PROCESS VARIABLE OF INTEREST MONITORING AND CONTROL

FIELD OF THE INVENTION

Disclosed embodiments of the invention relate to the field of substrate manufacturing processes, and more particularly, embodiments of the invention relate to process monitoring and/or process control of the lithography process, where both the process variables and the physical properties of the product being processed may be assessed based on available observable data, and which may be non-separable and non-linear functions of the process variables and physical properties.

BACKGROUND OF THE INVENTION

Lithography has a variety of useful applications, including the manufacture of semiconductor devices, flat-panel displays, disk heads and the like. Designers and semiconductor device manufacturers constantly strive to develop smaller devices from, for example, semiconductor wafers, recognizing that circuits with smaller features generally produce greater speeds and increased yield. However, with smaller devices, it is becoming increasingly difficult to meet required critical dimension (CD) tolerances. Minor variations in various process parameters of the lithography exposure equipment (e.g. scanners/steppers), may cause the feature CDs to fall outside acceptable tolerance (e.g. +/-8%-10%).

The quality of the image pattern and feature CD may be affected by process variables, such as exposure dose and focus. Variations of dose can occur and may be caused by variations in the resist sensitivity, resist thickness, bake temperature and delay, anti-reflection coating and substrate films' thickness and optical constants. Variations of focus can occur and may be caused by, for example, variations in the substrate topography, substrate and mask/reticle chucking or flatness, errors of lithography system's auto-focus system, imperfections of focus servo control loop and interactions with product/layer stepping and focusing sequence, as well as focus drift. Variations in these process parameters can also result in errors of pattern placement manifested as feature-/layout-dependent layer-to-layer overlay (O/L) variations. As the feature CD gets smaller for smaller devices, the need for reduction of such errors increases. Imaged patterns require effective process monitoring to determine if the lithography process is within an acceptable tolerance range. Adjustments to dose and focus, for example, may need to be made to keep feature size and placement within acceptable tolerances.

CD and O/L are periodically checked to assure product quality, sometimes as infrequent as weekly, which leaves many semiconductor devices being processed to be at risk before errors are detected and corrections/adjustments are made. CD-related process monitoring may be done in a variety of ways, including, for example, using test substrates or test features, as well as patterns produced on production substrates. CD is typically measured using a critical dimension scanning electron microscope (CD-SEM). However, CD is a complex function of both dose and focus. It is difficult to establish based on CD alone, if CD variation is due to dose or focus having moved from its respective set point. Furthermore, since the lithography process is routinely optimized to result in the least possible CD variation through the process (dose and focus) window, such observable CD variations are very small, rendering conventional lithography process monitoring with CD-SEM both ineffective and inefficient.

Other CD-related process monitoring approaches include, but are not limited to scatterometry techniques (ellipsometry, variable angle, reflection) using complex look-up libraries, and optical CD techniques utilizing optical metrology tools and dual tone arrays to indirectly measure the critical dimensions using line-end shortening techniques.

BRIEF DESCRIPTION OF THE DRAWINGS

Embodiments of the invention are illustrated by way of example and not by way of limitation in the figures of the accompanying drawings, in which the like references indicate similar elements and in which:

FIG. 1 illustrates a block diagram of an example method of estimating a process variable of interest in accordance with an embodiment of the present invention;

FIG. 3 illustrates a block diagram of an example method of validating an estimated process variable of interest in accordance with an embodiment of the present invention;

FIG. 4 illustrates a block diagram of an example method of using process variable of interest estimators to control a process in accordance with an embodiment of the present invention.

DETAILED DESCRIPTION OF EMBODIMENTS OF THE INVENTION

Figure 2A:
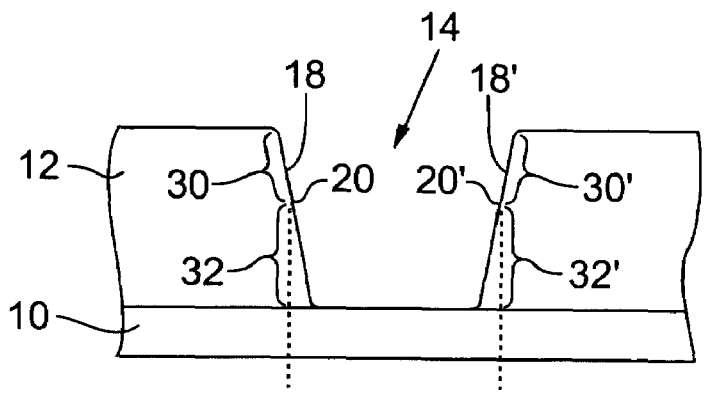
FIG. 2A illustrates a cross-sectional view of a feature on a substrate in accordance with an embodiment of the present invention.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Embodiments in accordance with the present invention provide methods for on-product monitoring that may estimate values for the process variables, such as dose and focus of a lithography process, to allow for efficient and timely detection of variations in the process variables on product-, layer-, and/or stepping-specific device features. Embodiments in accordance with the present invention may allow for the estimation of one process variable, such as dose, independently from the influence of another process variable, such as focus, and visa versa, based on the feature of interest's image attributes collected during many different monitoring and analyzing techniques, including, but not limited to CD-SEM.

In an embodiment in accordance with the present invention, application of CD-SEM edge detection algorithms and the resulting image diagnostics in the test and/or device features may be used to provide feedback control data for error correction on subsequent processing of product substrates. Efficient and timely detection of process variable variations, with product-, layer-, and stepping-specific errors may be determined by collecting data captured during, for example, the CD-SEM measurement process, but which is not normally utilized. These data may be used in conjunction with a numerical estimator that has been reduced to consider only the process variable of interest.

FIG. 1 illustrates a block diagram of an exemplary system for monitoring and estimating process variables of interest that may aid in controlling the lithography processing of substrates in accordance with an embodiment of the present invention. A process variable of interest may be selected to monitor and/or control (100). The process variable of interest may include, but is not limited to dose or focus. The process variable of interest may be selected based on a desire to monitor and control the process variable to regularly generate an estimate that will enable its control so that the process error, and impact on CD and device performance, may stay within an acceptable range.

Once the process variable of interest is determined, at least one device feature (feature of interest) may be printed in the photoresist, with the process variable of interest being appropriately commanded or exercised through a determined range or process window, while varying the process variable of interest over the expected range of values (110). Such printing may be accomplished in a variety of ways, including, but not limited to optical lithography, from infrared to visible light, to ultra-violet, to extreme ultra-violet, optical, x-ray and other proximity printing, ion, e-beam, optical and other scanning lithography.

In order to obtain numerical estimates of a process variable of interest, that variable may be commanded through a range of values, by inflicting certain changes in the printed feature, which may result in changes in the feature's microscopic image attributes in response to the commanded changes of the process variable of interest. For example, where focus or dose is the process variable of interest, a focus sequence or a dose sequence may be used, such that either focus or dose may be varied in such a way that it overwhelms the other process variables not considered for estimation and control for purpose of producing a detailed record of the image attributes in the output results collected with, for example a CD-SEM. Additionally, a focus exposure matrix (FEM) may be used.

A microscope based metrology system may be used to generate an image of the feature of interest affected by the commanded process variable (120). In one embodiment in accordance with the present invention, a CD-SEM may be used to inspect the feature and produce the numerical values of the image attributes on the particular device feature. In other embodiments in accordance with the present invention, other metrology devices may be used to collect data on the feature of interest, including, but not limited to, Scanning Probe Microscopy (SPM), Atomic Force Microscopy (AFM), optical microscopy based metrology tools or other high-resolution microscopy.

Once an image of the feature of interest has been produced, numerical values/data of one or more image attributes of the feature of interest having the most significant response to the process variable of interest (e.g. free of various sources of noise and/or complementary with each other) may be collected (130). The numerical data may be generated and/or collected based on several image attributes of the feature of interest, including, but not limited to, characteristic widths, sidewall profiles, areas, aspect ratios and other characteristics of a 2-dimensional image.

In one embodiment in accordance with the present invention, a 1-dimensional waveform of the feature of interest may be generated using a CD-SEM, where the feature of interest is substantially linear by projecting and statistically adding and/or adding with corrections individual line scans across the feature of interest. Numerical data from various portions of the waveform may be collected, and may be used to create numerical estimates on the image attributes, such as image intensity and intensity changes (e.g. slopes and widths).

Figure 2B:
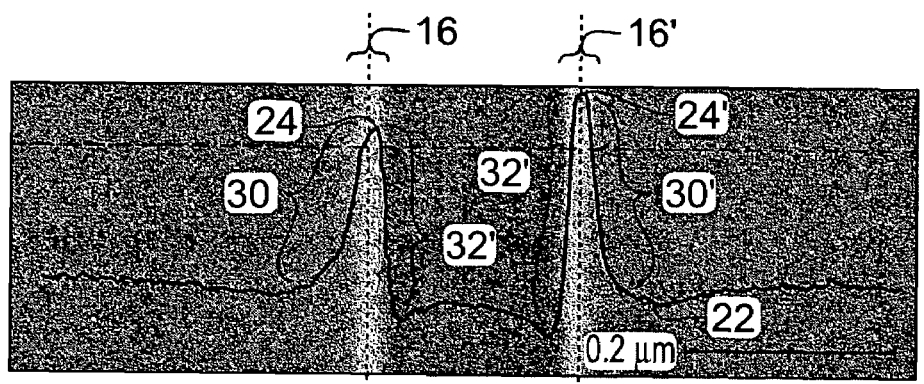
FIG. 2B illustrates a CD-SEM image of the feature of FIG. 2A in accordance with an embodiment of the present invention.
Figure 2C:
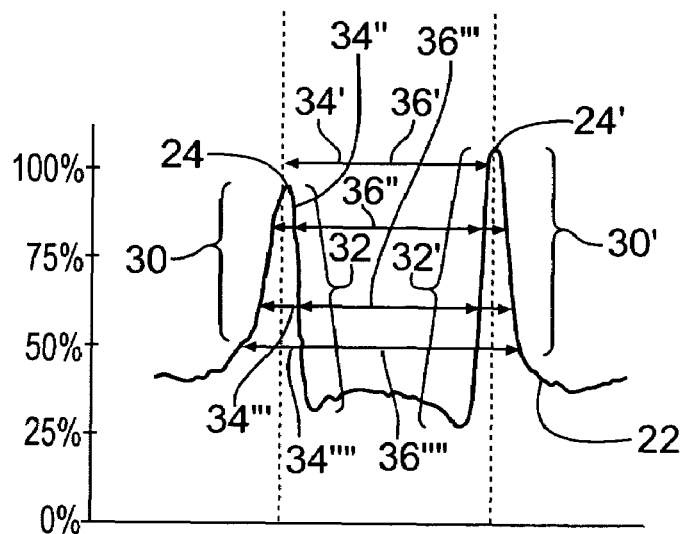
FIG. 2C Illustrates a one dimensional waveform of the feature of FIG. 2A in accordance with an embodiment of the present invention.

Referring now also to FIGS. 2A-2C, which illustrate an example feature and corresponding CD-SEM generated image in accordance with an embodiment of the present invention. FIG. 2A illustrates a feature whose image attributes may be used to detect the impact of the process variable of interest, which may allow an empirical estimator of this process variable of interest to be constructed. In one embodiment in accordance with the present invention, substrate 10 may have a photoresist 12 disposed thereon. Photoresist 12 may be developed such that a feature of interest 14, which may be, for example, a trench in resist, results and can expose a portion of substrate 10. Substrate 10 may include, but is not limited to, semiconductor wafer surfaces, various oxide layers, metal layers, and a variety of other single or multiple layer devices. Photoresist 12 may be any one of a variety of materials having photoreflective qualities. As illustrated, feature of interest 14 is an isolated trench feature, but in other embodiments, isolated line features and other one-dimensional and/or two dimensional device features may be used to perform such analysis and/or process monitoring.

FIG. 2B illustrates a top down CD-SEM image of the feature of FIG. 2A in accordance with an embodiment of the present invention. Regions 16 and 16' are referred to "edges in the image" and may substantially correspond to the positions of the sidewalls 18, 18' of the of the photoresist 12 defining feature of interest 14. Waveform 22 may be generated by the CD-SEM image representing 2-dimensional image intensity. Signal intensity in the waveform of CD-SEM image generally may be thought of as having the peak or maximum intensity point 24, 24' near an outside edge in the feature where secondary electrons may easily escape, and a troth or lower intensity point near an inside edge in the feature where secondary electrons tend to be trapped in the material. Further, inside 32, 32' (inner transitions) and outside 30, 30' (outer transitions) image intensity transitions may substantially correspond to resist rise/sidewall and resist erosion at the top of the feature of interest.

FIG. 2C illustrates a slightly exaggerated form of the two dimensional waveform generated by the CD-SEM image of the feature of FIG. 2A in accordance with an embodiment of the present invention. Waveform 22 may be comprised of a number of data points that may be utilized in building up the numerical data characterizing a selected image attribute of the feature of interest 14. In one embodiment image attribute data may be measured and collected at various points along the waveform 22.

For example, referring to the pair of left and right outer transitions 30 and 30', the rate of width change in these transitions can be measured by collecting CD data at different image intensity thresholds, from a low threshold to a high threshold, to map the outside transitions in the image of the feature of interest 14. Likewise, the same may be done to substantially characterize the inside transitions 32, 32' in the image waveform. For example, width measurements in the pair 30, 30' of the outer image transitions may be made at image intensity threshold of 100% (34'), 75% (34''), 50% (34'''), and 25% (34''''), or at even finer threshold increments, so as to substantially account for its properties. This same collection of image attributes in the inside transitions 32, 32' may be made at 100% (36'), 75% (36''), 50% (36'''), and 25% (36'''').

Given data at various points along the axis corresponding to various threshold values of the feature of interest (e.g. image intensity and/or image space) for both out measurements 34 and in measurements 36, which in current systems may often be measured, but not necessarily collected or used, numerical estimates of the selected attributes of the feature of interest can be produced. In various embodiments, more or less data points can be collected at the same or different points on the waveform curve. In one embodiment, more independent data points may be collected, which in turn may help to more completely characterize the image attributes and thus lead to a better numerical estimate for the process variable of interest.

In various embodiments, other numerical estimates can be derived from the data from an image of a feature of interest based on other image attributes, including, but not limited to, estimates of slopes, width, roughness, areas and shape distortion. In other various embodiments, other sampling methods may be used in addition to the waveform 22, out measurements 34 and in measurements 36 to characterize an image attribute, such as image intensity and image derivatives, three dimensional imaging and the like. In yet other various embodiments, the numerical estimates of the image attributes that vary the most when the process variable of interest is exercised may be accomplished by observing and identifying the image characteristics and/or through a substantially exhaustive sampling.

Referring back to FIG. 1, after generating numerical estimates for a selected image attribute of a feature of interest, an empirical estimator may be generated to estimate the value of the process variable of interest, such as dose or focus (140). Typically, a device feature's CD may be a function of two or more process variables (e.g. focus and dose), that are not readily estimated from CD. Accordingly, combinations of one or more single image attributes of a feature of interest may be selected that correlates to the process variable of interest that are relatively immune to other process variables, such as dose when estimating the value of focus, and to various sources of noise.

In one embodiment of the present invention, to build an empirical estimator, statistical models may be used where the number of degrees of freedom in the estimator may be less than the number of experimental input variables. Accordingly, the empirical estimator may be built such that it relies on the fewest possible variables so that the process variable of interest may be estimated with the least influence of other process variables and all sources of noise. This may be accomplished by increasing some common metric of the goodness of fit, such as correlation or $R^2$, and decreasing some common metric of the residual of fit, such as root mean square error (RMSE).

In one embodiment in accordance with the present invention, a numerical estimator of effective dose as the process variable of interest, for example, may be generated by a first least root mean square fitting to a second order function of focus and first order function of dose (approximation by a polynomial) for some of the attributes of a feature of interest. This function may be generally represented by $v^i_j$, where i is an index for the features available for the observation and j is the index of that feature's image attributes, such as characteristic widths and slopes in a 1-dimensional waveform. It could also be, for example, area, perimeter, radii, largest/smallest distances, and roughness in 2-dimensional images of the features. Given that the highest functional dependency on focus is $\sim FOCUS^2$, and it is to be suppressed in the estimate of effective dose, the image attributes to select may be such that they are correlated to a commanded dose and either a) are independent of defocus or b) have similar dependencies as function of focus (e.g. both fall or both rise in response to commanded defocus) but opposite responses to dose (e.g. one rises and the other falls when commanded dose is increased) or c) have opposite dependencies on focus (e.g. one falls and the other rises with commanded defocus) and similar responses to commanded dose (both rise or both fall when commanded dose is increased).

To build an estimator of effective dose that is largely immune to defocus, the focus-dependent terms may be removed as illustrated in the following equations. The resulting formula, with experimentally derived numerical coefficients, may be used to estimate effective exposure dose (the process variable of interest):

$$v^i_j = a1 * deFOCUS^2 + a2 * DOSE + a3 \| * b1$$

$$v^{i'}_{j'} = b1 * deFOCUS^2 + b2 * DOSE + b3 \| * a1$$

$$DOSE = ((v^i_j * b1 - v^{i'}_{j'} * a1) - (a3 * b1 - b3 * a1))/(a2 * b1 - b2 * a1)$$

where $v^i_j$ and $v^{i'}_{j'}$ are the values of two attributes in the images of one or two features and a1, a2, a3 are the constants derived from the least squares fit of second order polynomial to the experimental data for $v^i_j$ vs. FOCUS and DOSE and b1, b2, b3 are constants derived from the least squares fit of second order polynomial to experimental data for $v^{i'}_{j'}$ vs. FOCUS and DOSE.

Examples of device features and their image attributes suitable for estimation of dose may be a 1-dimensional and/or 2-dimensional features' widths, area or perimeter, with edge coordinates defined by image intensity threshold or other methods in the regions of fast change in image intensity as function of coordinates in image plane, such as in the outer transitions 34, 34'. In various embodiments, other methods for estimating the coefficients of the polynomial expansion of image attributes vs. focus, dose and other process parameters, thus becoming a part of empirical estimator, may be used.

In one embodiment in accordance with the present invention, suitable estimators can be generated using commercial computer programs, such as JMP produced by SAS Institute, Inc., Mathematica, Regress, and others. These estimators may be built with the properties of having, for example, the RMSE, least average absolute error and other common measures of goodness or performance. In various embodiments, some commercial programs may be employed to simultaneously account for one process variable of interest in the presence of other process variables and sources of noise, and where two or more process variables of interest, such as focus and dose, must be estimated from experimental data with minimal error of focus estimation introduced by the variations of dose and with minimal error of dose estimation introduced by the variations of focus.

After building an empirical estimator for the process variable of interest, the estimator may be validated to confirm the largest deviation of error over a selected process window is within an acceptable tolerance. (150). FIG. 3 illustrates a block diagram of an example method for validating the estimated variable of interest in accordance with an embodiment of the present invention. One or more device features of interest may be printed during the lithography process that are different in at least one practically important aspect from that used for building the estimator. These device features may have a certain process variable(s) of interest inflicted over a range of desired operability, including a set of fixed and known values (300). Also, features may be printed that have no commanded change of process variable, with other variables also fixed or allowed to vary over their expected range.

The process variable of interest may then be estimated for these printed device features in accordance with embodiments of the present invention as described with respect to FIG. 1 (310). The results of the numerical estimator for the process variable of interest may be verified by comparing the changes in estimated/predicted values to the known values of changes in the process variable of interest (320).

The similarity of monitor responses between lithography systems, for example, can be compared, and the errors of estimation of a process variable of interest can be determined. If the deviation of predicted monitor responses to variable change is within an acceptable tolerance, for example +/−10%, then the estimator may be deemed to be valid and may be used for process monitoring and active control of the process. If, in some applications, the error of prediction is greater than the allowed tolerance, then adjustments can be made and/or the monitor application may be limited to where it is valid.

Having a validated estimator for the process variable of interest, the estimator may be used to control the processing of substrates (160). FIG. 4 illustrates a block diagram of an example method of using process variable of interest estimators to monitor and control a process in accordance with an embodiment of the present invention. In various embodiments, estimates of process variables of interest, such as focus and dose, may be effective, in that their values reflect the total effect of lithography, including, for example, substrate and resist characteristics, processing parameter implications and the like. Accordingly, the estimator may be deemed validated and useful to monitor a process variance, for example, if a 10% change in commanded dose results in approximately 10% change of on-product estimate of dose, and/or a −50 nm change in commanded focus results in approximately −50 nm change of on-product estimate of focus.

In one embodiment of the present invention, once the empirical estimator is validated, the process variables of interest may be observed and analyzed over a predetermined period of time to establish a performance baseline or average estimated process variable of interest (400). A baseline average may be established over the predetermined period and may account for an average estimated value and a selected standard deviation variance of, for example, one-degree of standard deviation (410). The baseline average them may be designated as the set point for that variance (420). Upper and lower control limits may be established according to statistics based criteria and set for threshold limits (430).

Once the set point and control limits have been established, the process variable of interest may be monitored. Future process variations over time may then be monitored by comparing the most recent process variable of interest estimation to the set point of the process variable of interest to establish a change in the process variable of interest (440).

The process may be monitored for a process excursion of an estimated process variable of interest (e.g. falling outside a control limit or values trending away from the baseline average) and a corrective feedback control loop may trigger a process interruption (hold) and/or some other corrective action (450).

A corrective feedback control loop may be employed to maintain control of the process to bring the process variable of interest closer to the set point. This may be done, for example, by manually or automatically commanding a change to the process variable of interest, with the commanded increment being, for example, −1*(recent estimate—set point) to negate the difference. In other embodiments in accordance with the present invention, other methods and values of commanded correction may be used, such as exponentially weighted moving average (EWMA), to complete an efficient corrective feedback loop. In various embodiments, these control methods may be applied to dose and focus, as well as other process variables of interest.

Figure 5:
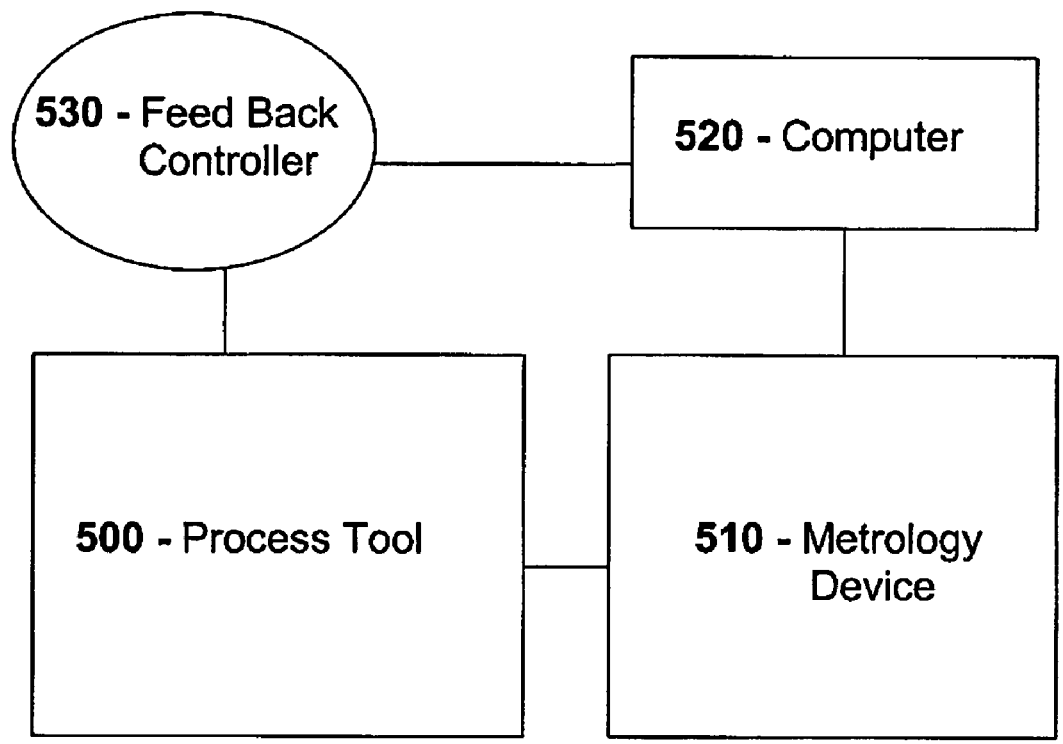
FIG. 5 illustrates an example system suitable for practicing various embodiments of the methods of the present invention, in accordance with one embodiment.

FIG. 5 illustrates an example system suitable for practicing various embodiments of the methods of the present invention, in accordance with one embodiment. A process tool 500 may be adapted to process substrates, such as semiconductor wafers. Process tool 500 may include a lithography system capable of variably generating at least one process variable of interest, such as dose or focus. A metrology device 510 may be configured to inspect a feature of interest of a substrate being processed, where for example, the feature of interest has been inflicted by a process variable of interest command over a determined process window. Metrology device 510 may collect data on at least one image attribute of the feature of interest.

A computer 520 may be in communication with the metrology device 510, and include a numerical estimator in accordance with an embodiment of the present invention. The computer 520 may estimate the process variable of interest based on the data collected on the at least one image attribute and compare the estimated value of the process variable of interest with a known set point value. A corrective feedback controller 530 may be in communication with the computer and the process tool, and be configured to control the process variable of interest by making adjustments as needed to reduce or eliminate, for example, process excursions.

In one embodiment where CD related lithography process control is implemented, effective dose may be the primary process variable used in the process control loop to keep the time trend of effective dose stable and on dose set-point, with measurements of developed CD vs. predetermined CD set point and CD control limits serving as measures of quality, not a part of process control loop. When resist CD must be re-targeted, a dose increment may be made according to an existing practice and the expected new baseline average, and the upper and lower control limits for both resist CD and the estimated dose may then be redefined.

In one embodiment monitoring and/or controlling of effective focus in accordance with embodiments of the present invention may be used to reduce the CD variance beyond that which may be achievable with active control of exposure dose only. In various embodiments, all other sources of CD variance fixed, within wafer and lot-to-lot variance of developed CD may be the lowest at a certain "best focus," which is not necessarily the same as best focus established by conventional analyses of the images printed in an FEM wafer, for example.

The variance of resist CD in production environment may be analyzed against observed values of effective focus.

Small changes of focus may be made by commanding a focus change to bring effective focus to a value that corresponds to the lowest variance of resist CD or by making a small incremental change in the direction of decreasing variance. In various embodiments, these commanded changes can be manual or automatic, such as through the use of a corrective feed back loop.

In one embodiment of the present invention, better process control may be established by analysis of etched CD variance for the material exposed. With other sources of CD variance fixed, in various embodiments, etched CD variance may be the lowest at a particular best focus value. Etched CD variance vs. effective focus (established in accordance with embodiments of the present invention) may then be analyzed for natural or commanded focus changes around a presumed best focus value. The estimated focus that corresponds to the lowest variance of etched CD, or is in the direction of defocus that leads to reduction of etched CD variance, may be established and a corresponding change of focus may be commanded.

In one embodiment of the present invention, monitoring certain process variables of interest, such as effective focus and/or effective dose, may be used to reduce device performance variation, such as effective gate width or clock speed, and increase performance and/or yield. Better process control may be enabled by analysis of that device variation vs. effective focus and/or dose in the developed resist image. In various embodiments, that focus and dose variations may result in device performance variations, and thus may affect the maximum achievable performance and yield. Device variations, performance and yield may be analyzed against effective focus and/or dose for natural or commanded focus changes around presumed best focus value. The values that correspond to the lowest device variance value and/or to the highest performance and yield, or the values that trend in the direction of defocus that leads to reduction of variance, increase of yield and performance may be established and changes of focus and/or dose may be commanded.

In embodiments of the present invention, whether monitoring and controlling a lithography process, or reducing variance in developed resist image, etched CD, and/or device performance, the commanded changes can be manual or automatic, such as through the use of a corrective feedback loop. In various embodiments, these process variable of interest adjustments may not necessarily be made to keep the process variable of interest in control and on target with the set point, but may be commanded to adjust the set point itself to a value at which the variance is the lowest and any deviations, both up and down, result in an increase of that variance. Accordingly, variances may continually be monitored, for example, from die-to die, wafer to wafer, lot to lot, run to run, machine to machine, etc., such that regular fine tuning may be made to ensure that better and higher performance devices are consistently produced.

Other embodiments of the present invention may be used as a predictor of future properties of the feature of interest, which may allow for feed forward control. In one embodiment, estimators of etched CD, "electrical CD" and the like may be produced in accordance with embodiments of the present invention. Unlike known feed forward process control that rely on the measured values of resist CD as the predictor of etched CD, lithography process control in accordance with embodiments of the present invention may be used to predict the etched CD.

Similar to building an estimator of a lithography process variable of interest, as described with respect to FIG. 1, a predictor/estimator of etched CD may be built. In one embodiment, a feature of interest is printed on the product using lithography with certain process variables exercised. Numerical data may be collected on desired image attributes of the feature of interest, such as characteristic width. The estimator may then be built in accordance with embodiments of the present invention. For products etched in a particular etcher, etched CD may be measured in the same feature of interest at the same product locations. Paired populations of resist image attributes and the corresponding etched CDs may be compared. Of all the characteristic widths measured in the image of the resist feature, only one may have the highest correlation to etched CD. Thus, in various embodiments, the characteristic width in the image of the resist feature may be designated as the best predictor of etched CD, and used as such.

In another embodiment of the present invention, predictor of etched CD produced by various etchers and lithography systems by using more than one image attribute of resist feature to build an empirical predictor/estimator. To select the characteristic attributes to use, such as widths or slopes, a substantially complete sampling of image attributes may be collected and analyzed. An effective predictor/estimator may be built using statistical modeling programs available through commercial software tools expressed in estimated etched CD as a function of the image attributes. For applications to CD related process control, the resulting predicted value for etched CD may be more accurate and reliable than known methods, which rely on or use the resist CD plus the average etch bias to predict the etched CD.

Embodiments of the present invention may also be used where a process parameter is not known quantitatively, but is known to be either "good" or "not good" in a qualitative sense. Predictors/estimators of goodness built in accordance with embodiments of the present invention may be built and used for excursion control. As long as the estimated values stay within a predetermined range of the values known to be within a process goodness threshold, then the process may continue. Where a predicted value falls outside the goodness threshold (e.g. a product excursion), the process may be stopped to enable corrective action.

In one embodiment of the present invention, product may be intentionally processed in normal (good) and abnormal (not good) process conditions during lithography and/or etch, with a device feature printed for each condition. These features may then be observed in a microscope based metrology system, such as a CD SEM, and the image attributes measured and reported. The resulting image attributes may be compared. Those image attributes that exhibit the largest observable change may be designated as an indicator of process goodness, and may be used to detect and trigger a process excursion.

Examples of such qualitative applications include, but are not limited to excursion monitoring of lithography and etch processes, such as a shallow trench isolation (STI) etch, poly gate etch, metal etch, contact and via etch. In these applications the good and not good process responses may be characterized ahead of time and the statistical control limits are set up for lot-to-lot monitoring. In one embodiment in accordance with the present invention, an indicator of process goodness may be used to compare the sameness of both the process and of the process equipment.

In one embodiment of the present invention, an indicator/estimator of a feature's side wall left-right symmetry may also be produced. In various embodiments, such indicators may be useful to ensure that the process produces symmetric features, which may be necessary to enable accurate alignment and overlay metrology, as well as to preclude the lookup of flip flows, SRAM and the like, for example. Other applications include but are not limited to assuring left-right device pairs' matching and control of device matching within wafer, and lot-to-lot device variations.

In one embodiment of the present invention, a predictor/estimator of side wall angle at various points in the feature may be produced, and may enable monitoring and control of etched feature side wall. Similar to building an estimator of a lithography process variable of interest, as described with respect to FIG. 1, a feature of interest may be printed using lithography process and etched in a manner that will affect the feature sidewall angle. The feature of interest may be produced through a range of sidewall angles, for example, by changing parameters of etch process, including reactive species' chemistry, pressure, temperature and the like. Etched image attributes and corresponding side wall angle measurements may be collected, and a estimator of feature sidewall angle may be built in accordance with FIG. 1.

In various embodiments, empirical estimators built may produce more effective monitoring and controls where a) the information about the property of interest is actually present and measurable in the image of a feature of interest, b) that substantially all other variables have been either suppressed by in the design/build of the estimator or are kept low in the applications and c) that essential aspects of both the process being monitored and the metrology system used to acquire the data are substantially the same at the time the monitor was built and calibrated and during its use in applications. A number of techniques may be employed to verify these underlying assumptions, maintain them true and confirm a monitor's precision, accuracy and applicability.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that embodiments in accordance with this invention be limited only by the claims and the equivalents thereof.

What is claimed is:

1. A method for producing an empirical estimator of a process variable of interest, comprising:
   selecting a process variable of interest to monitor through a selected process window;
   printing at least one feature of interest on a surface of a substrate with a change in the process variable of interest commanded over the selected process window;
   generating an image of the feature of interest using a microscope-based metrology tool;
   collecting numerical values for at least one image attribute of the feature of interest over the exercised process window; and
   establishing a correlation of the image attribute to the process variable of interest to produce an empirical estimator of the process variable of interest, said empirical estimator having a formula $((v^i_j*b1-v^{i'}_{j'}*a1)-(a3*b1-b3*a1))/(a2*b1-b2*a1)$, wherein $v^i_j$ and $v^{i'}_{j'}$ are values of two image attributes and a1, a2, a3 are constants derived from a least squares fit of a second order polynomial to the experimental data for $v^i_j$ vs. focus and dose, and b1, b2, b3 are constants derived from the least squares fit of a second order polynomial to experimental data for $v^{i'}_{j'}$ vs. focus and dose.

2. The method of claim 1, wherein the selecting of a process variable of interest to monitor includes selecting either dose or focus.

3. The method of claim 1, wherein the printing of at least one feature of interest includes commanding the process variable of interest over the process window so that a response in terms of numerical values of the process variable of interest dominates other process variables.

4. The method of claim 1, wherein the printing of at least one feature of interest includes commanding the process variable of interest over the process window using one of a group consisting of a focus sequence, a dose sequence and a focus exposure matrix.

5. The method of claim 1, wherein the microscope-based metrology tool is a scanning electron microscope, and the collecting of numerical values for at least one image attribute includes:
   forming a two-dimensional image of the feature of interest;
   generating a one-dimensional waveform corresponding to a portion of the two-dimensional image of the feature of interest;
   selecting an image attribute of the feature of interest to characterize; and
   collecting numerical values of the image attribute from the one dimensional wave form sufficient to characterize the selected image attribute.

6. The method of claim 5, wherein the selecting of an image attribute includes selecting one of a group consisting of slope, width, roughness, area and shape.

7. The method of claim 1, wherein the establishing of a correlation of the process variable of interest includes using one of a regression analysis program selected from a group consisting of JMP, Mathematica and Regress.

8. The method of claim 1, further comprising validating an accuracy of the estimator.

9. The method of claim 8, wherein the validating of accuracy of the estimator includes
   printing multiple features of interest that have the process variable of interest inflicted at known values;
   estimating the values for the process variable of interest using the empirical estimator; and
   comparing the estimated values to the fixed known values.

10. The method of claim 9, wherein the validating of accuracy of the estimator includes determining if the estimated values for the process variable of interest are within +/−10% of the known values for the process variable of interest.

11. The method of claim 1, further comprising:
    estimating another process variable of interest of another substrate using the empirical estimator; and
    comparing the estimated value of the other process variable of interest with a set point value.

12. The method of claim 11, wherein the set point comprises an average of the process variable of interest observed over a predetermined time period.

13. A method for controlling the lithography process, comprising:
    observing a process variable of interest over a predetermined time period;
    estimating baseline values of the process variable of interest using an empirical estimator having a formula $((v^i_j*b1-v^{i'}_{j'}*a1)-(a3*b1-b3*a1))/(a2*b1-b2*a1)$, wherein $v^i_j$ and $v^{i'}_{j'}$ are values of two image attributes and a1, a2, a3 are constants derived from a least squares fit of a second order polynomial to the experimental data for $v^i_j$ vs. focus and dose, and b1, b2, b3 are constants derived from the least squares fit of a second order polynomial to experimental data for $v^{i'}_{j'}$ vs. focus and dose;

establishing a baseline average value and a variance for the process variable of interest from the estimated baseline values;

setting the baseline average as a set point;

monitoring the lithography process for a deviation from the set point; and taking a corrective action if an unacceptable deviation is detected.

14. The method of claim 13, wherein the taking of a corrective action includes determining that an unacceptable deviation is when a recent value for the process variable of interest exceeds the variance.

15. The method of claim 13, wherein the monitoring of the lithography process includes comparing a recent value for a process variable of interest with the set point to establish a first difference, and wherein taking a corrective action includes employing a corrective feedback control loop to make adjustments to the process variable of interest to reduce the first difference.

16. The method of claim 15, wherein the taking of corrective action includes adding the negative of the first difference to the recent value of the process variable of interest.

17. The method of claim 13, wherein the taking of corrective action includes triggering a process interruption.

18. The method of claim 13, wherein the taking of corrective action includes adjusting the process variable of interest to reduce one of a group consisting of a critical dimension variance, a defect level, and a yield loss.

19. The method of claim 13, wherein the taking of a corrective action includes
   identifying a new set point value for the process variable of interest; and
   resetting the baseline average to correspond to the new set point value.

20. The method of claim 19, wherein the identifying of a new value includes identifying a point where the variance in critical dimension is the lowest value observed.

21. The method of claim 19, wherein the identifying of a new value includes identifying a point where a device yield is the highest and a circuit speed is the highest value observed.

22. The method of claim 13, further comprising setting upper and lower control limits for the process variable of interest, and wherein an unacceptable variation is one where the process variable of interest exceeds either the upper or lower control limit.

23. A system for monitoring and controlling process variables of interest during a lithography process, comprising:
   a process tool adapted to process substrates, the process tool including a lithography system capable of variably generating at least one process variable of interest;
   a metrology tool configured to inspect a feature of interest of a substrate, and collect data on at least one image attribute of the feature of interest, the feature of interest having been inflicted by a process variable of interest command over a determined process window;
   a computer having a numerical estimator to estimate the process variable of interest based on the data collected on the at least one image attribute and compare the estimated value of the process variable of interest with a set point value, the numerical estimator configured to estimate the process variable of interest using a formula $((v^i_j * b1 - v^{i'}_{j'} * a1) - (a3 * b1 - b3 * a1))/(a2 * b1 - b2 * a1)$, wherein $v^i_j$ and $v^{i'}_{j'}$ are values of two image attributes and a1, a2, a3 are constants derived from a least squares fit of a second order polynomial to the experimental data for $v^i_j$ vs. focus and dose, and b1, b2, b3 are constants derived from the least squares fit of a second order polynomial to experimental data for $v^{i'}_{j'}$ vs. focus and dose; and
   a corrective feed back controller in communication with the computer and the process tool, the corrective feed back controller configured to control the process variable of interest.

24. The system of claim 23, wherein the process variable of interest is dose or focus.

25. The system of claim 24, wherein the microscope based metrology tool is a scanning electron microscope.

26. A method for producing an empirical predictor of a device property of interest, comprising:
   selecting a device property of interest and a future property of a corresponding at least one feature of interest to monitor through a process having a normal range of variation, the at least one future property including a critical dimension of the at least one feature of interest as it will be after an etch process;
   printing the at least one feature of interest with the corresponding at least one device property of interest on a surface of a semiconductor substrate using the process controlled at near nominal values;
   generating an image of the at least one feature of interest using a microscope-based metrology tool;
   etching the substrate under a normal process control until the device property of interest may be directly measured; and
   after said etching, establishing a correlation of the image attribute to the device property of interest to produce an empirical predictor of the device property of interest.

27. The method of claim 26, further comprising controlling a microelectronic device manufacturing process, said controlling comprising:
   observing predictions of the empirical predictor for a device parameter of interest of interest for the microelectronic device manufacturing process in its uncorrected state; and
   taking a corrective action if an observed prediction falls outside an acceptable target mean value and variance.

28. The method of claim 27, wherein the taking of a corrective action includes adjusting a subsequent processing step to cause the device parameter of interest to converge towards a target mean value and variance.

29. The method of claim 26, wherein said establishing the correlation comprises comparing the at least one feature of interest to the corresponding at least one device property and determining the critical dimension of the at least one feature of interest having the highest correlation to a critical dimension of the at least one device property.

* * * * *

UNITED STATES PATENT AND TRADEMARK OFFICE
CERTIFICATE OF CORRECTION

PATENT NO. : 7,369,697 B2
APPLICATION NO. : 10/871294
DATED : May 6, 2008
INVENTOR(S) : Alexander Starikov It is certified that error appears in the above-identified patent and that said Letters Patent is hereby corrected as shown below:

Fig. 1
"100-...to monitor/or and control." should be --100-...to monitor and/or control.--.

Column 14
Lines 47-48, "...a device parameter of interest of interest for a..." should read --...a device parameter of interest for a...--.

Signed and Sealed this

First Day of September, 2009

David J. Kappos
*Director of the United States Patent and Trademark Office*